United States Patent [19]

Dan et al.

[11] Patent Number: 4,630,806
[45] Date of Patent: Dec. 23, 1986

[54] LIQUID-FILLED ELASTOMERIC BUSHINGS

[75] Inventors: Takuya Dan; Michihiro Orikawa, both of Yokohama, Japan

[73] Assignee: Bridgestone Corporation, Tokyo, Japan

[21] Appl. No.: 720,318

[22] Filed: Apr. 5, 1985

[30] Foreign Application Priority Data

Apr. 5, 1984 [JP] Japan ................... 59-66635
Feb. 15, 1985 [JP] Japan ................... 60-26440

[51] Int. Cl.⁴ ............................................. F16F 1/36
[52] U.S. Cl. .................................. 267/140.1; 16/2
[58] Field of Search .......... 16/2; 267/140.1, 63 R, 267/63 A, 153

[56] References Cited

U.S. PATENT DOCUMENTS

| | | | |
|---|---|---|---|
| 3,559,979 | 2/1971 | Muller | 267/153 |
| 3,642,268 | 2/1972 | Hipsher | 267/140.1 |
| 3,698,703 | 10/1972 | Hipsher | 267/140.1 |
| 4,377,216 | 3/1983 | Ueno | 267/63 R |

FOREIGN PATENT DOCUMENTS 164242  12/1981  Japan ................... 267/140.1

Primary Examiner—Donald R. Schran
Assistant Examiner—James L. Wolfe
Attorney, Agent, or Firm—Sughrue, Mion, Zinn, Macpeak, and Seas

[57] ABSTRACT

A liquid-filled elastomeric bushing is disclosed, which comprises an inner sleeve, an outer sleeve, an elastomeric member disposed between the inner and outer sleeves and provided at its axially middle portion with liquid chambers, intermediate rings interposed between the elastomeric member and the outer sleeve and bonded to both end portions of the elastomeric member, and a restricted passage establishing communication between liquid chambers.

6 Claims, 6 Drawing Figures

LIQUID-FILLED ELASTOMERIC BUSHINGS

BACKGROUND OF THE INVENTION

1. Field of the Invention

This invention relates to a liquid-filled elastomeric bushing for use in automobiles, industrial machines and the like developing an effective damping action.

2. Description of the Prior Art

Heretofore, there have been known liquid-filled elastomeric bushings, wherein the damping of vibrations is mainly performed by a flow resistance subjected to an incompressible liquid enclosed in liquid chambers. Such is disclosed, for example, in German Patent Specification No. 2,841,505.

Such an elastomeric bushing comprises an inner sleeve, an outer sleeve, an elastomeric member interposed between the inner and outer sleeves and provided with recesses constituting liquid chambers, and an intermediate sleeve disposed between the outer periphery of the elastomeric member and the outer sleeve and provided with holes corresponding to the contour profile of the liquid chamber and with restricted passages formed in the outer periphery thereof to establish communication between the liquid chambers.

In this liquid-filled elastomeric bushing, however, the fixing of the outer sleeve to the intermediate sleeve is generally carried out by squeezing, so that there is a fear that the restricted passage formed in the outer periphery of the intermediate sleeve of rigid material is deformed by the squeezing to deteriorate the given damping action. Furthermore, the deformations in circumferential and axial directions of the elastomeric member are caused by the incompressible liquid in the liquid chamber during squeezing, while the intermediate sleeve fixed to the outer periphery of the elastomeric member acts to restrain these deformations, so that a large initial stress is locally applied to the interior of the elastomeric member and the joint surface between the elastomeric member and the intermediate sleeve. That reduces the durability of the elastomeric bushing and produces the vibration damping performance.

Moreover, since the intermediate sleeve is constituted by forming plural holes in the hollow cylindrical member having a length substantially equal to the elastomeric bushing, the number of the working steps and material cost of the intermediate sleeve become higher and also the weight of the elastomeric bushing becomes undesirably large.

SUMMARY OF THE INVENTION

It is, therefore, an object of the invention to advantageously solve the aforementioned problems of the prior art and to provide a liquid-filled elastomeric bushing which is provided with a restricted passage that is not or to an insubstantial degree affected by the squeezing of the outer sleeve and effectively mitigates the local action of large initial stress during squeezing and reduces the weight, number of working steps and the like.

According to the invention, there is the provision of a liquid-filled elastomeric bushing comprising inner and outer sleeves coaxially arranged with each other, an elastomeric member disposed between the inner and outer sleeves, plural liquid chambers formed in the axially middle portion of the elastomeric member at a given interval in the circumferential direction thereof, two intermediate rings interposed between the elastomeric member and the outer sleeve at both axially end portions of the elastomeric member, and at least one restricted passage establishing communication between the liquid chambers.

BRIEF DESCRIPTION OF THE DRAWINGS

The invention will now be described with reference to the accompanying drawings, wherein.

DETAILED DESCRIPTION OF THE INVENTION

In the liquid-filled elastomeric bushing according to the invention, the sufficient liquid tightness against the liquid enclosed in the liquid chambers is produced by squeezing the outer sleeve to the elastomeric member provided at both end portions with the intermediate rings, so that the number of working steps, material cost and weight of the elastomeric bushing are reduced as compared with the prior art using the intermediate sleeve constituted by forming plural holes in the hollow cylindrical member. Further, the intermediate rings located only at both end portions of the elastomeric member do not substantially restrain the deformation in the circumferential direction of the elastomeric member defining the liquid chambers and can move in the mutually separating directions against deformation in the axial direction of the elastomeric member, so that the rising of internal pressure inside the liquid chambers becomes difficult due to the separating of the intermediate rings and the resonance of the liquid is liable to be caused to make the vibration damping action large. Also, the large initial stress is not locally applied to the elastomeric member and the joint surface between the elastomeric member and the intermediate ring in the region of such a joint surface or in the vicinity thereof, so that the durability of the bushing is further improved.

According to the invention, the restricted passage is formed on the inner or outer peripheral portion of the elastomeric member, or in the interior of the elastomeric member. Moreover, the size of the restricted passage may somewhat be extended by the rising of internal pressure inside the liquid chambers during the squeezing of the outer sleeve. Therefore, the size of the restricted passage is determined by estimating the extending part accompanied with the rising of internal pressure, whereby the given vibration damping action can be attained at a desired passage length. If necessary, a pipe made from iron, copper, synthetic resin or the like may be fitted into the restricted passage for preventing deformation of the restricted passage in the squeezing of the outer sleeve.

Figure 1A:
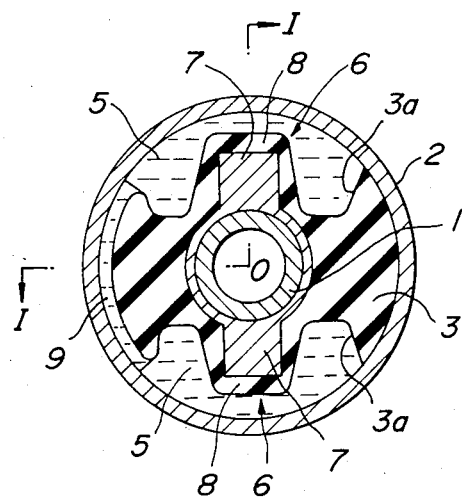
FIGS. 1a and 1b are sectional views of an embodiment of the liquid-filled elastomeric bushing according to the invention.
Figure 1B:
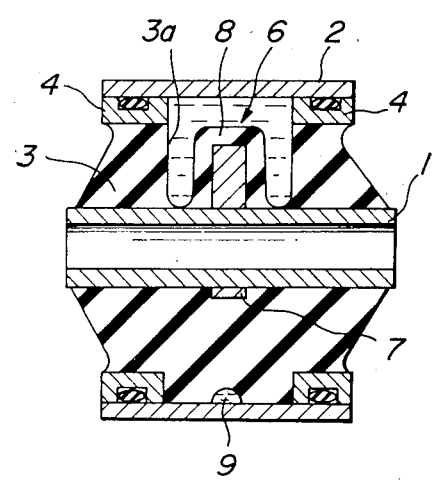

In FIGS. 1a and 1b is sectionally shown an embodiment of the liquid-filled elastomeric bushing according to the invention, wherein numeral 1 is an inner sleeve, numeral 2 an outer sleeve and numeral 3 an elastomeric member interposed between the inner and outer sleeves 1 and 2 made of steel.

The elastomeric member 3 is composed of rubber, rubbery elastomer or the like and bonded to the inner sleeve 1 by vulcanization or with an adhesive or a binder. On the other hand, the elastomeric member 3 is fixed to the outer sleeve 2 by squeezing thereof, wherein the outer sleeve 2 is squeezed to the elastomeric member 3 at the axially middle portion thereof and to intermediate rings 4, 4, which are bonded by vulcanization to the elastomeric member 3, at both axially end portions of the elastomeric member. Therefore, it is required that the axially middle portion of the elastomeric member 3 subjected to direct squeezing of the outer sleeve 2 has a diameter somewhat larger than the outer diameter of the intermediate ring 4 so as not to form a gap between the outer sleeve 2 and the elastomeric member 3. To perform squeezing, it is preferable to utilize one-step radial squeezing in liquid for preventing the flowing-in of air and the biting of the O-ring.

In the elastomeric member 3, two recesses 3a are formed in the axially middle portion and opposed to each other in the radial direction. Therefore, a liquid chamber 5 is constituted by filling incompressible liquid in a space defined by the recess 3a, intermediate ring 4 and outer sleeve 2. In each of the liquid chambers 5 is disposed a stopper 6 protruding from the inner sleeve or outer sleeve, which is not an essential requirement in the invention. In the illustrated embodiment, the stoppper 6 is constituted by fitting a bossed rigid member 7 into the inner sleeve 1 and covering the outer surface of the member 7 with an elastomeric material 8 having the same quality as the elastomeric member 3. This stopper 6 acts to restrain the relative displacement between the inner and outer sleeves 1 and 2 under a buffering action of the elastomeric material 8 when such a displacement is excessive.

Figure 2A:
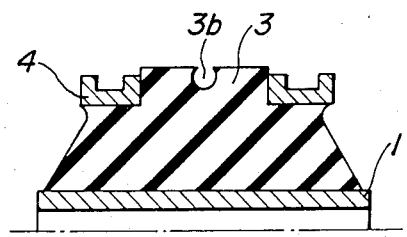
FIGS. 2a and 2b are sectional views of two embodiments illustrating the restricted passage in the liquid-filled elastomeric bushing according to the invention, respectively.
Figure 2B:
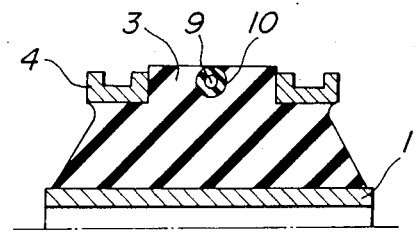
Figure 3A:
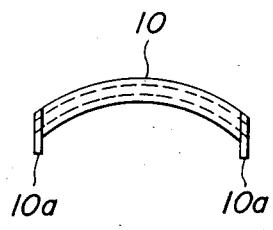
FIGS. 3a and 3b are side view and front view of a pipe to be fitted in the restricted passage, respectively.
Figure 3B:
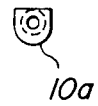

According to the invention, a restricted passage 9 is arranged in that portion of the elastomeric member 3 which is subjected to direct squeezing of the outer sleeve 2 between the elastomeric member 3 and the outer sleeve 2 to establish communication between the liquid chambers 5, 5. In the illustrated embodiment, the restricted passage 9 is defined by a groove 3b formed on the outer periphery of the elastomeric member 3 and having a curved shape in section such as an arc, a U-shape or the like as shown in FIG. 2a and that portion of the outer sleeve 2 which faces the groove 3b in the squeezing to the elastomeric member. Alternatively, the restricted passage 9 may be constituted by fitting a pipe 10 as shown in FIG. 2b into the groove 3b as shown in FIG. 2a. In the latter case, the pipe 10 may be made of iron, copper, synthetic resin or the like. In order to provide the exact positioning of the pipe 10 to the groove 3b, it is preferable that the pipe 10 is intimately fitted into the groove 3b having a size somewhat smaller than the outer diameter of the pipe and is provided at both ends with a flange 10a engaging with the edge of the recess 3a as shown in FIGS. 3a and 3b.

If the stress concentration to the peripheral portion of the restricted passage 9 is out of the problem, the sectional shape of the restricted passage 9 may be made polygonal such as triangular, rectangular or the like irrespective of the fitting of the pipe. Moreover, if a length sufficient enough to develop the given vibration damping is ensured in the restricted passage 9 as far as possible, such a passage may be straight or sinuously formed in the interior of the elastomeric member 3 (including the stopper 6) in radial direction at a curved or polygonal form.

In the liquid-filled elastomeric bushing of the above structure, satisfactory liquid tightness in the axial direction of the bushing is produced by the squeezing of the outer sleeve 2 to the intermediate ring 4, made for example of steel, while liquid tightness in the circumferential direction of the bushing is produced by the squeezing of the outer sleeve 2 to the axially middle portion of the elastomeric member 3. Therefore, the flowing of incompressible liquid in the bushing is performed between the liquid chambers through only the restricted passage 9. Thus, various energy losses are given to the liquid passing through the restricted passage 9 having a properly selected length, so that vibrations transmitted to the inner or outer sleeve can be damped by the above energy losses as expected.

Moreover, each of the intermediate rings 4, 4 according to the invention is only a simple ring, so that the number of working steps, material cost and weight are considerably reduced as compared with the prior art. Also, the intermediate rings 4, 4 bonded to only both end portions of the elastomeric member 3 do not so restrain deformations in circumferential and axial directions of the elastomeric member 3 in the squeezing of the outer sleeve 2, so that the rising of internal pressure inside the liquid chambers is small and the resonance of liquid is liable to be caused to provide high vibration damping action. In addition, the large initial stress is not applied to the joint portion between the elastomeric member 3 and the intermediate ring 4 or the vicinity thereof. Therefore, the durability and vibration damping performances of the bushing are considerably enhanced according to the invention.

Although the invention has been described with respect to the illustrated embodiment, it is apparent that many modifications or variations may be made without departing from the scope of the invention. For instance, two or more restricted passages may be provided in the bushing, or the restricted passage may sinuously be formed in at least one of axial and radial directions of the bushing, or the number of liquid chambers may be three or more.

As mentioned above, according to the invention, the intermediate rings are arranged on both end portions of the elastomeric member and also the restricted passage establishing communication among plural liquid chambers is arranged on the axially middle portion of the elastomeric member. Thus, the number of working steps, material cost and weight of the intermediate ring itself and hence the elastomeric bushing are considerably reduced. Also, the reduction of damping performance due to the rising of liquid pressure in the squeezing of the outer sleeve, deformation of the restricted passage and local occurrence of large initial stress are prevented sufficiently and effectively.

What is claimed is:

1. A liquid-filled elastomeric bushing comprising; inner and outer sleeves coaxially arranged with each other, an elastomeric member disposed between the inner and outer sleeves and bonded only to the inner sleeve, plural liquid chambers formed in the axially middle portion of the elastomeric member at a given interval in the circumferential direction thereof, two separate intermediate rings interposed between the elastomeric member and the outer sleeve only at both axial end portions of the elastomeric member and bonded to the elastomeric member so that said intermediate rings can move in an axial direction to prevent rising of internal pressure inside said liquid chambers, each of said rings provided at its outer peripheral surface with a circumferential groove, an O-ring in each of the grooves, and at least one restricted passage formed on the outer peripheral in the middle portion of the elastomeric member and establishing communication between the liquid chambers.

2. The liquid-filled elastomeric bushing according to claim 1, wherein the outer sleeve is fixed to the intermediate rings bonded to both end portions of the elastomeric member and the remaining middle portion of the elastomeric member by one-step radial squeezing in liquid.

3. The liquid-filled elastomeric bushing according to claim 1, wherein the restricted passage is defined by a groove formed on the outer periphery in the middle portion of the elastomeric member together with the outer sleeve.

4. The liquid-filled elastomeric bushing according to claim 1, wherein the restricted passage is constituted by fitting a pipe into a groove formed on the outer periphery in the middle portion of the elastomeric member.

5. The liquid-filled elastomeric bushing according to claim 1, wherein the restricted passage is defined by a groove formed on the inner periphery in the middle portion of the elastomeric member together with the inner sleeve.

6. The liquid-filled elastomeric bushing according to claim 1, wherein the restricted passage is formed in the interior of the elastomeric member.

* * * * *